(12) United States Patent
Zhang et al.

(10) Patent No.: US 8,259,651 B2
(45) Date of Patent: Sep. 4, 2012

(54) SYSTEM AND METHOD FOR MULTIPLEXING ON AN LTE UPLINK CONTROL CHANNEL

(75) Inventors: Jianzhong Zhang, Irving, TX (US); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 12/284,822

(22) Filed: Sep. 25, 2008

(65) Prior Publication Data

US 2009/0245169 A1    Oct. 1, 2009

Related U.S. Application Data

(60) Provisional application No. 61/064,765, filed on Mar. 25, 2008.

(51) Int. Cl.
*H04W 4/00* (2009.01)
(52) U.S. Cl. ........................................... 370/328
(58) Field of Classification Search .............. 370/328, 370/260
See application file for complete search history.

(56) References Cited

U.S. PATENT DOCUMENTS

| 7,133,688 | B2 | 11/2006 | Das et al. | |
| 2007/0030839 | A1 | 2/2007 | Vimpari et al. | |
| 2007/0242770 | A1 | 10/2007 | Kim et al. | |
| 2008/0219370 | A1* | 9/2008 | Onggosanusi et al. | 375/260 |
| 2009/0207784 | A1* | 8/2009 | Lee et al. | 370/328 |
| 2010/0183086 | A1* | 7/2010 | Ko et al. | 375/260 |

FOREIGN PATENT DOCUMENTS

| EP | 1 533 966 A2 | 5/2005 |
| EP | 1 575 234 A2 | 9/2005 |
| EP | 1 750 407 A1 | 2/2007 |
| KR | 1020070050579 A | 5/2007 |

OTHER PUBLICATIONS

International Search Report dated Sep. 1, 2009 in connection with PCT Application No. PCT/KR2009/001327.
European Search Report dated Sep. 28, 2011 in connection with European Patent Application No. EP 09 72 4075.
"Separate Rank and CQI Feedback in PUCCH", Texas Instruments, 3GPP TSG RAN WG1 #52, Feb. 11-15, 2008, 8 pages.
"3rd Generation Partnership Project; Technical Specification Group Radio Access Network; Evolved Universal Terrestrial Radio Access (E-UTRA); Physical layer procedures (Release 8)", 3GPP TS 36.213 v8.2.0, Mar. 2008, 31 pages.
"CQI report formats", Samsung, 3GPP TSG-RAN Working Group 1 #52, Feb. 11-15, 2008, 5 pages.

* cited by examiner

*Primary Examiner* — Albert T Chou

(57) ABSTRACT

A wireless communication network comprising a plurality of base stations capable of wireless communication with a plurality of subscriber stations within a coverage area of the network, wherein at least one of the plurality of base stations is capable of: determining a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel; transmitting the multiplexing scheme to a subscriber station; and receiving, from the subscriber station, an FS CQI/PMI feedback report multiplexed with a WB CQI/PMI feedback report and a RI report on the physical uplink control channel according to the multiplexing scheme.

12 Claims, 7 Drawing Sheets

SYSTEM AND METHOD FOR MULTIPLEXING ON AN LTE UPLINK CONTROL CHANNEL

CROSS-REFERENCE TO RELATED APPLICATION(S) AND CLAIM OF PRIORITY

The present application is related to U.S. Provisional Patent No. 61/064,765, filed Mar. 25, 2008, entitled "METHODS OF UTILIZING UPLINK CONTROL CHANNEL IN LTE". Provisional Patent No. 61/064,765 is assigned to the assignee of the present application and is hereby incorporated by reference into the present application as if fully set forth herein. The present application hereby claims priority under 35 U.S.C. §119(e) to U.S. Provisional Patent No. 61/064,765.

TECHNICAL FIELD OF THE INVENTION

The present application relates generally to wireless communications and, more specifically, to a technique for multiplexing on a long term evolution (LTE) uplink control channel.

BACKGROUND OF THE INVENTION

Recently, the multiplexing of a rank information (RI) feedback report with a wideband channel quality information/precoding matrix index (WB CQI/PMI) feedback report on a physical uplink control channel (PUCCH) has been proposed. One proposed method of multiplexing the RI report with the WB CQI/PMI report on a PUCCH involves allowing different offsets between the RI and the WB CQI/PMI reports while keeping the period of the RI report as an integer multiple of the WB CQI/PMI report. This method would drop the WB CQI/PMI report if a collision occurs between the WB CQI/PMI and RI reports, and the most recently transmitted RI report on the PUCCH would be used by a user equipment (UE) (or subscriber station) to calculate the WB CQI/PMI reported on the configured resource on the PUCCH.

In this method, a Node-B (or base station) configures a single CQI reporting resource for either a RI report or a WB CQI/PMI report for each UE during each reporting instance. A reporting instance refers to a sub-frame where a report is performed. This method does not transmit the RI report and the WB CQI/PMI in the same reporting instance. Rather, only the RI is reported instead of the WB CQI/PMI in every M-th CQI reporting instance according to a higher layer configuration, and the WB CQI/PMI is reported in the remaining CQI reporting instances.

FIG. 3 illustrates an example of CQI reporting instances 300. In this example, M=4 and the offset between the RI report and the WB CQI/PMI is −1. Accordingly, WB CQI/PMI reports 302 occur in reporting instances 1-3 and 5-7 with RI reports 304 occurring in reporting instances 0 and 4 or every $4^{th}$ (or M-th) reporting instance.

Another proposed method configures the periods of and the offset between the RI and the WB CQI/PMI reports independently. This method also would drop the WB CQI/PMI report if a collision occurs between the WB CQI/PMI report and the RI report.

Similar methods may be used for multiplexing frequency-selective (FS) CQI/PMI and RI reports on a PUCCH.

Therefore, there is a need in the art for an improved system and method for multiplexing WB CQI/PMI, FS CQI/PMI and RI reports on a PUCCH. In particular, there is a need for a comprehensive solution for multiplexing WB CQI/PMI reports with FS CQI/PMI reports as well as RI reports on a PUCCH.

SUMMARY OF THE INVENTION

A wireless communication network comprising a plurality of base stations capable of wireless communication with a plurality of subscriber stations within a coverage area of the network, wherein at least one of the plurality of base stations is capable of: determining a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel; transmitting the multiplexing scheme to a subscriber station; and receiving, from the subscriber station, an FS CQI/PMI feedback report multiplexed with a WB CQI/PMI feedback report and a RI report on the physical uplink control channel according to the multiplexing scheme A base station capable of wireless communication with a plurality of subscriber stations within a coverage area of a network, where the base station is capable of: determining a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel; transmitting the multiplexing scheme to a subscriber station; and receiving, from the subscriber station, an FS CQI/PMI feedback report multiplexed with an WB CQI/PMI feedback report and an RI report on the physical uplink control channel according to the multiplexing scheme.

A mobile station capable of communicating with a wireless network having a base station, where the mobile station: is operable to receive, from the base station, a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel; and is operable to transmit on the physical uplink control channel an FS CQI/PMI feedback report, a WB CQI/PMI feedback report and a rank information (RI) report multiplexed according to the received multiplexing scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
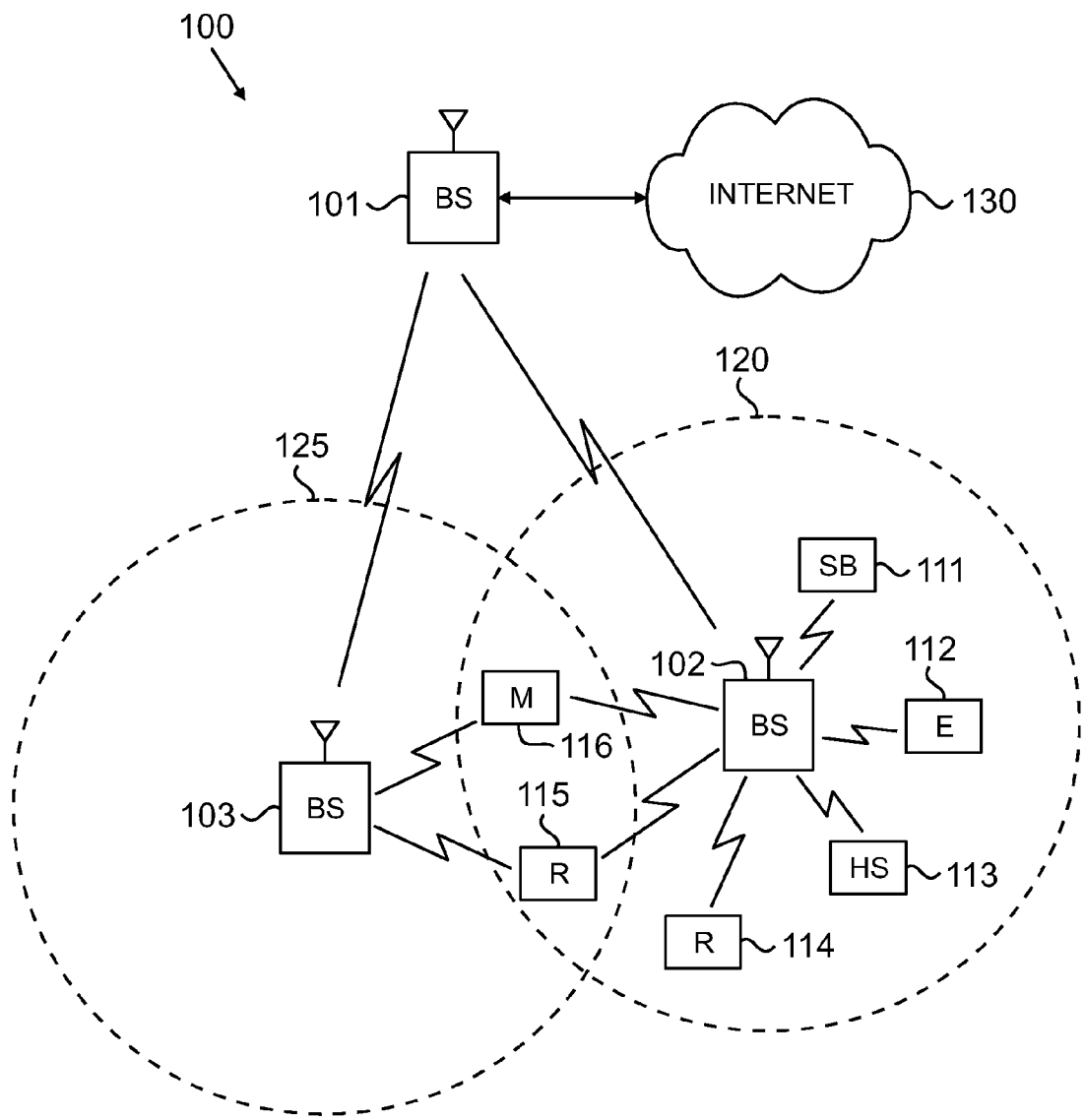
FIG. 1 illustrates an exemplary wireless network that transmits ACK/NACK messages in the uplink according to the principles of the present disclosure.

FIG. 1 illustrates exemplary wireless network 100, which transmits ACK/NACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
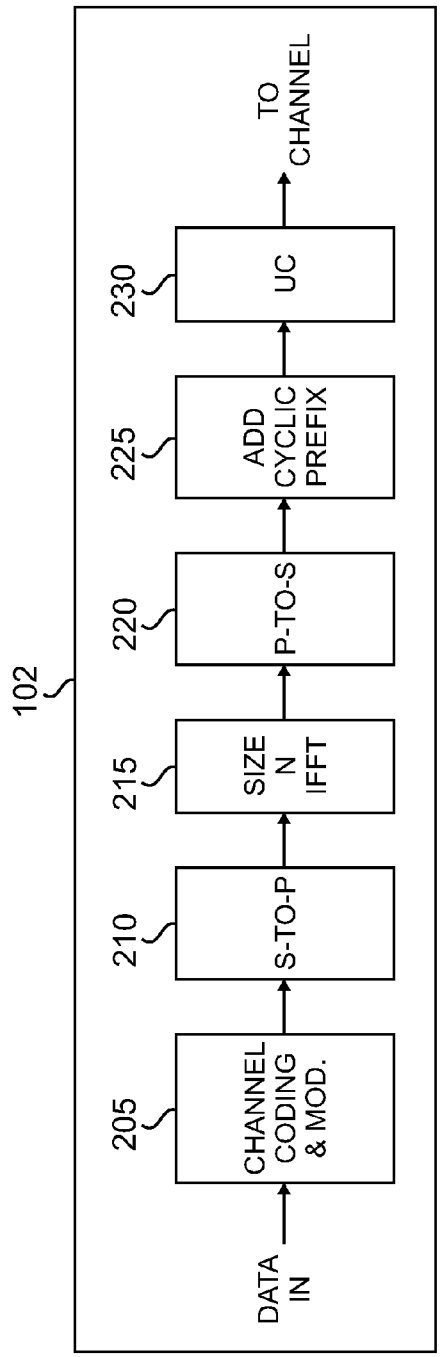
FIG. 2A is a high-level diagram of an OFDMA transmitter according to one embodiment of the present disclosure.
Figure 2B:
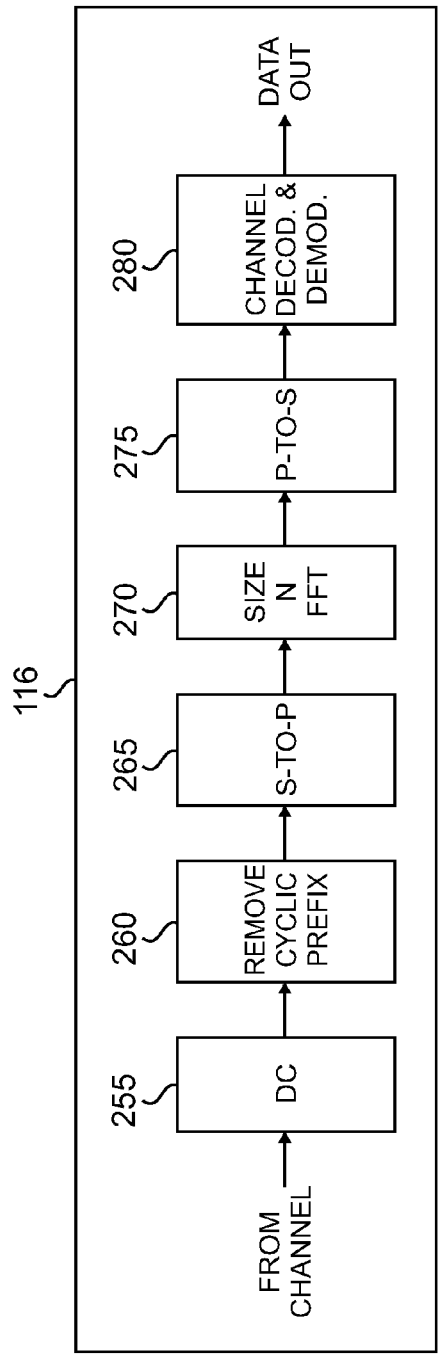
FIG. 2B is a high-level diagram of an OFDMA receiver according to one embodiment of the present disclosure.
Figure 3:
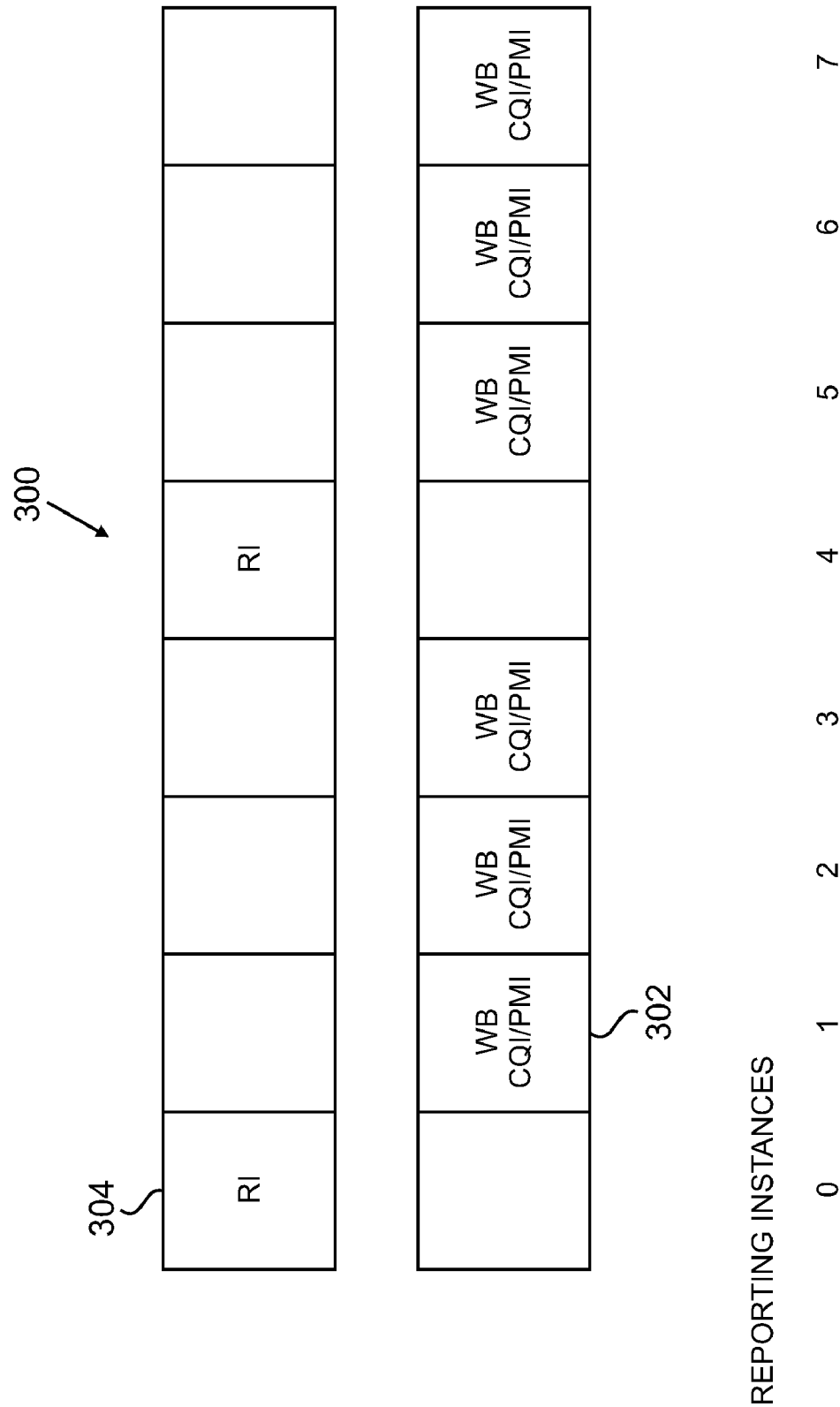
FIG. 3 illustrates an example of CQI reporting instances.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system for multiplexing wideband (WB) CQI/PMI reports with frequency-selective (FS) CQI/PMI reports as well as RI reports on a PUCCH.

According to a first method of the present disclosure, a Node-B configures a single CQI reporting resource for either a WB CQI/PMI report or an FS CQI/PMI report during each reporting instance. The period of the WB CQI/PMI report and the FS CQI/PMI report may be, for example, every P sub-frame. The WB CQI/PMI report and the FS CQI/PMI report are not submitted in the same reporting instance or sub-frame. Instead, the WB CQI/PMI is reported alone instead of the FS CQI/PMI in every L-th CQI reporting instance according to a higher layer configuration. Accordingly, the WB CQI/PMI reporting period is every L*P sub-frame with the FS CQI/PMI reported in the remaining CQI reporting instances.

In addition, the Node-B can configure another CQI reporting instance for RI reporting for each UE. The period of the RI reporting is M times that of the FS CQI/PMI reporting or every M*P sub-frames. An offset (typically between 0 to L*P-1 sub-frames) is allowed between RI and the WB CQI/PMI reporting. If a collision occurs between the RI report and either the WB CQI/PMI or FS CQI/PMI reports, the WB CQI/PMI or FS CQI/PMI report is dropped.

In one embodiment, the parameters P, L, and M are configured by a higher layer message, such as a radio resource control (RRC) message, in a semi-static manner.

Figure 4:
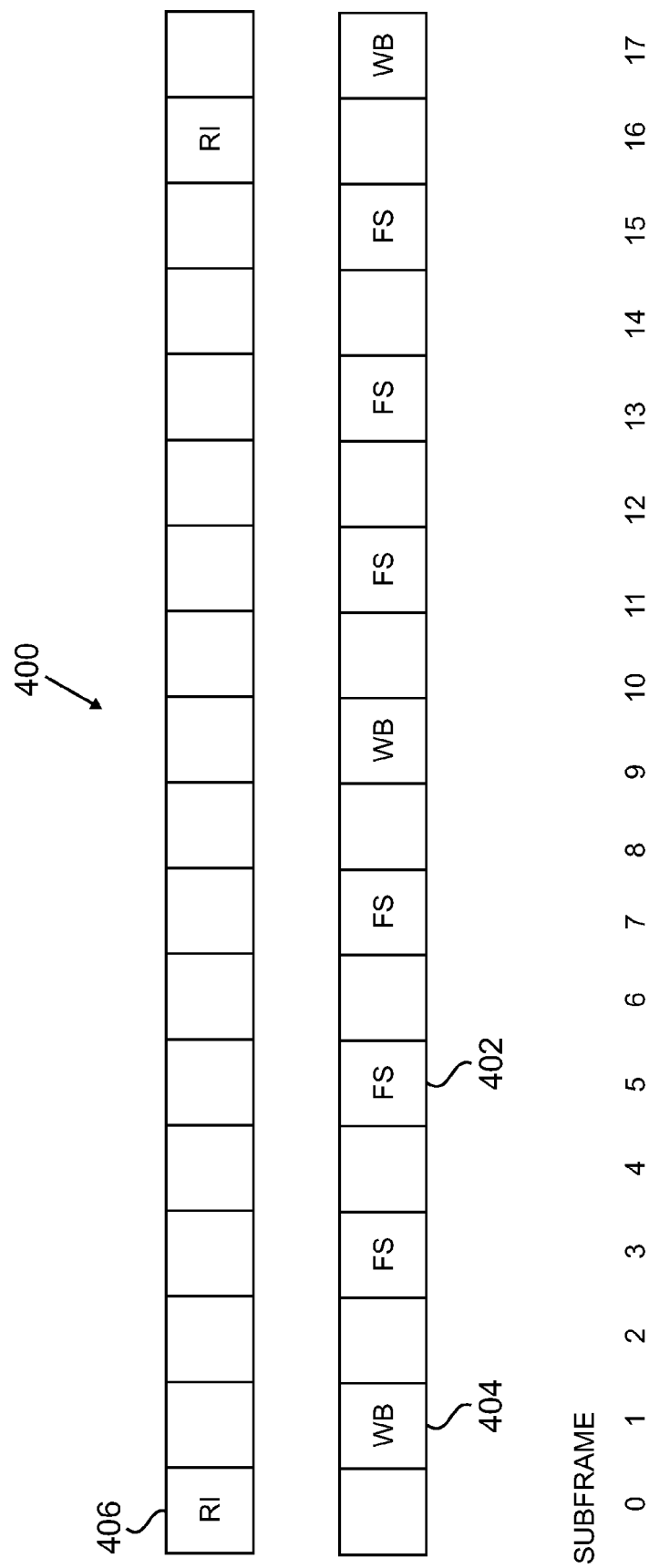
FIG. 4 illustrates an example of CQI reporting instances according to an embodiment of the present disclosure.

FIG. 4 illustrates an example of CQI reporting instances 400 according to an embodiment of the present disclosure. In this example, P=2, L=4, M=8 and the offset between the RI and WB CQI/PMI reports is −1. FS or WB CQI/PMI reports occur in every $2^{nd}$ (or P-th) sub-frame. Specifically, FS CQI/PMI reports 402 occur in sub-frames 3, 5, 7, 11, 13, and 15. WB CQI/PMI reports 404 occur in sub-frames 1, 9 and 17 (every $8^{th}$ or M-th sub-frame). RI reports 406 occur in sub-frames 0 and 16 (every $16^{th}$ or M*P-th sub-frame).

According to a second method of the present disclosure, the WB CQI/PMI report is jointed transmitted with rank bits in the same sub-frame, and the FS CQI/PMI report is transmitted in the remaining CQI reporting instances.

In addition, the Node-B transmits the RI reporting together with some or all of the WB CQI/PMI feedback reports. The RI reporting period is an integer multiple of the WB CQI/PMI feedback reporting period and is denoted by every K*L*P sub-frames. In this embodiment, P represents the reporting period of the FS CQI/PMI report, and L*P represents the reporting period of the WB CQI/PMI report. Rank bits are reported on the sub-frames where the WB CQI/PMI report exists. However, as shown in FIG. 5, not all WB CQI/PMI reporting sub-frames include RI.

Figure 5:
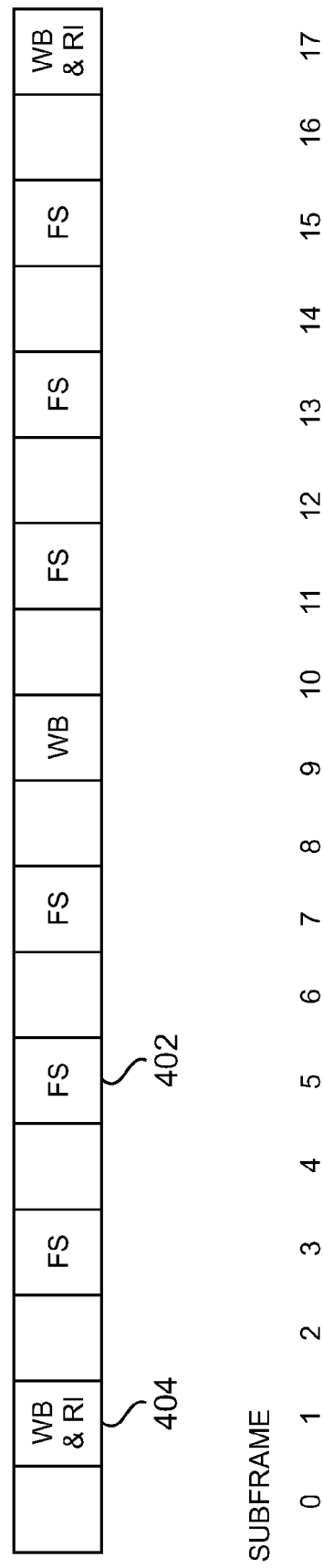
FIG. 5 illustrates an example of CQI reporting instances according to another embodiment of the present disclosure.

FIG. 5 illustrates an example of CQI reporting instances 500 according to another embodiment of the present disclosure. In this example, P=2, L=4, and K=2. FS or WB CQI/PMI reports occur in every $2^{nd}$ (or P-th) sub-frame. Specifically, FS CQI/PMI reports 502 occur in sub-frames 3, 5, 7, 11, 13, and 15. WB CQI/PMI reports 504 occur in sub-frames 1, 9 and 17 (every $8^{th}$ or L*P-th sub-frame). RI reports are jointed transmitted with the WB CQI/PMI reports in sub-frames 1 and 17 (every $16^{th}$ or K*L*P-th sub-frame). In this example, the WB CQI/PMI reporting sub-frame 9 does not include RI.

In one example, for the sub-frames in which WB CQI/PMI reporting is jointly coded with RI, formats 2, 2a, and 2b defined in 3GGP specification 36.212[2] are used. In this example, format 2 is used when the joint WB CQI/PMI and RI report is not multiplexed with ACK/NACK (acknowledged/not acknowledged) bits. Format 2a/2b is used when joint WB CQI/PMI and RI report is multiplexed with ACK/NACK bits for a short cyclic prefix. Format 2 is used when joint WB CQI/PMI and RI report is multiplexed with ACK/NAK bits for a long cyclic prefix.

Table 1 illustrates an example of a payload size for the jointly coded RI and WB CQI/PMI reports in a case of closed-loop spatial multiplexing in a PUCCH.

TABLE 1

| | (closed-loop spatial multiplexing) | | | |
|---|---|---|---|---|
| | 2-Tx | | 4-Tx | |
| Field | Rank = 1 | Rank = 2 | Rank = 1 | Rank > 1 |
| Wideband CQI | 4 | 7 (4 + 3) | 4 | 7 (4 + 3) |
| Wideband PMI | [2 or 3] | [1 or 2] | 4 | 4 |
| RI | 1 | 1 | 2 | 2 |
| Total | 7 or 8 | 9 or 10 | 10 | 13 |

Table 2 illustrates an example of a payload size for the jointly coded RI and WB CQI/PMI reports in a case of open-loop spatial multiplexing in a PUCCH.

TABLE 2

| | (open-loop spatial multiplexing) | | | |
|---|---|---|---|---|
| | 2-Tx | | 4-Tx | |
| Field | Rank = 1 | Rank = 2 | Rank = 1 | Rank > 1 |
| Wideband CQI | 4 | 4 | 4 | 4 |
| Wideband PMI | — | — | — | — |
| RI | 1 | 1 | 2 | 2 |
| Total | 5 | 5 | 6 | 6 |

In the case in which the WB CQI/PMI and RI report is not multiplexed with ACK/NACK bits for a short (normal) cyclic prefix case, in one example, the rank information sub-code is multiplexed with the WB CQI/PMI bits to form a linear block code of jointly coded RI sub-code and WB CQI/PMI bits as defined by Table 5.2.3.3-1 in 3GGP specification 36.212[2], which provide better protection for the RI sub-code compared to the WB CQI/PMI bits.

In the case in which the WB CQI/PMI and RI report is multiplexed with ACK/NACK bits for an extended cyclic case, in one example, the rank information subcode is multiplexed with ACK/NACK sub-code as well as the WB CQI/PMI bits to form a linear block code of jointly coded RI subcode and WB CQI/PMI bits as defined by Table 5.2.3.3-1 in 3GGP specification 36.212[2].

According to one example (assuming that the number of coded bits after the RI sub-code is $Q_{RI}$), if there is only one rank bit, denoted by $O_0^{RI}$, then the rank bit is repeated $Q_{RI}$ time to form the codeword. If there are two rank bits (denoted by $[Q_1^{RI} O_0^{RI}]$), the two rank bits are simply repeated $\lfloor Q_{RI}/2 \rfloor$ times to form the codeword. For example, if $Q_{RI}=4$, the codeword is given by $[Q_1^{RI} O_0^{RI} O_0^{RI}]$. If $Q_{RI}$ is not an even number, the codeword is concatenated with $O_1^{RI}$ or $O_0^{RI}$.

To form the coded bits for the two rank bits $[Q_1^{RI} O_0^{RI}]$, the two rank bits are mapped to a 3-bit codeword according to the simplex (3,2) code shown in Table 3 below.

TABLE 3 component simplex (3, 2) code used for two rank bits.

| Two information bits (either A/N bits or rank bits) | Component codeword $c_1c_2c_3$ (Simplex (3, 2) codebook) |
|---|---|
| 00 | 000 |
| 01 | 011 |
| 10 | 101 |
| 11 | 110 |

The codeword is repeated $\lfloor Q_{RI}/3 \rfloor$ times, and the resulting sequence is concatenated with the first $Q_{RI}-3*\lfloor Q_{RI}/2 \rfloor$ bits in the codeword $c_1c_2c_3$. This concatenated bit sequence is the final coded bit sequence to be modulated and mapped into the channel sequence.

In another embodiment of the present disclosure, the Node-B uses a higher-layer signal to semi-statically configure a given UE to operate using either the first or second method mentioned above, for example, according to cell, antenna, and channel configurations.

In one example, if a UE is performing open-loop spatial multiplexing, the second method could be a more suitable choice as the total payload is at most 6 bits for the jointly coded WB CQI/PMI and RI reports. Therefore, the coverage of this joint report is not expected to be an issue while the savings in PUCCH resource is significant.

In another example, if a UE is performing closed-loop spatial multiplexing in extended cyclic prefix, the Node-B can configure the PUCCH report of the UE using the first method since the jointly coded WB CQI/PMI and RI reports will have a payload up to 13 bits. When combined with up to 2 ACK/NACK bits, the resulting payload will exceed the allowable payload supported by format 2 in extended cyclic prefix. Therefore, the second method would not be a good choice in this case.

Figure 6:
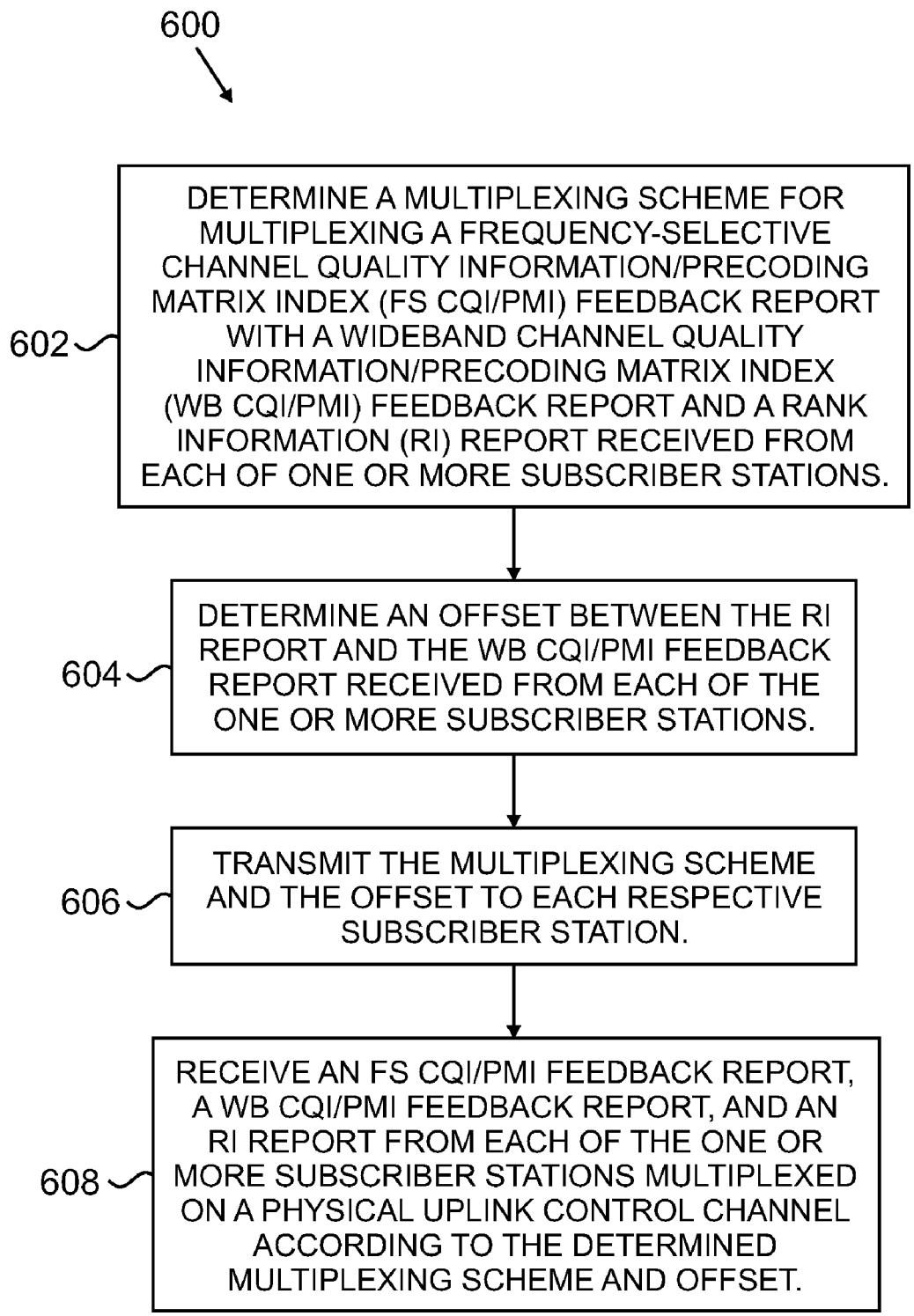
FIG. 6 illustrates a method of operating a base station according to an embodiment of the present disclosure.

FIG. 6 illustrates a method 600 of operating a base station according to an embodiment of the present disclosure. In step 602, the base station determines a multiplexing scheme for a frequency-selective channel quality information/precoding matrix index (FS CQI/PMI) feedback report with a wideband channel quality information/precoding matrix index (WB CQI/PMI) feedback report and a rank information (RI) report received from each of one or more subscriber stations. In step 604, the base station determines an offset between the RI report and the WB CQI/PMI feedback report received from each of the one or more subscriber stations. In step 606, the base station transmits the multiplexing scheme and the offset to each respective subscriber station. In step 606, the base station receives an FS CQI/PMI feedback report, a WB CQI/PMI feedback report, and an RI report from each of the one or more subscriber stations multiplexed on a physical uplink control channel according to the determined multiplexing scheme and offset. This step may include receiving the FS CQI/PMI feedback report and the WB CQI/PMI feedback report in different sub-frames of the physical uplink control channel. This step may further include receiving the FS CQI/PMI feedback report in every P-th sub-frame of a first set of sub-frames and reporting the WB CQI/PMI feedback report in stead of the FS CQI/PMI feedback report in every L*P-th sub-frame of the first set of sub-frames. In step 608, the base station proceeds to scheduling and link adaptation for each subscriber station based upon the received FS CQI/PMI feedback report, WB CQI/PMI feedback report, and RI report.

Figure 7:
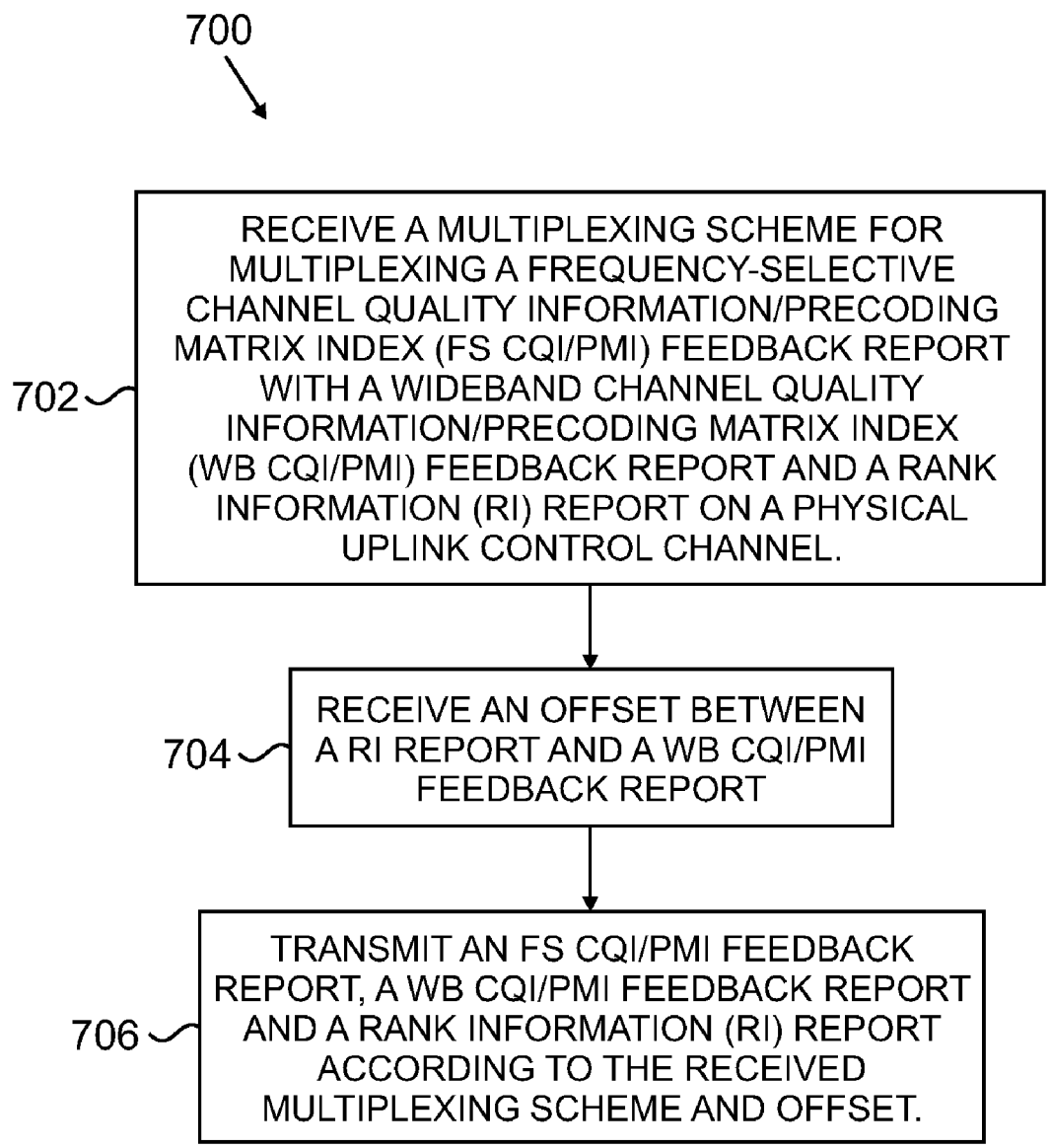
FIG. 7 illustrates a method of operating a subscriber station according to an embodiment of the present disclosure.

FIG. 7 illustrates a method 700 of operating a subscriber station according to an embodiment of the present disclosure. In step 702, a subscriber station receives a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel. In step 704, the subscriber station receives an offset between a RI report and a WB CQI/PMI feedback report. In step 706, the subscriber station transmits an FS CQI/PMI feedback report, a WB CQI/PMI feedback report and a rank information (RI) report according to the received multiplexing scheme and offset. This step may include transmitting the FS CQI/PMI feedback report and the WB CQI/PMI feedback report in different sub-frames of the physical uplink control channel. This step may further include transmitting the FS CQI/PMI feedback report in every P-th sub-frame of a first set of sub-frames and reporting the WB CQI/PMI feedback report in stead of the FS CQI/PMI feedback report in every L*P-th sub-frame of the first set of sub-frames.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for reporting channel information based on periodic reporting instances by a mobile station in a communication system, the method comprising:

scheduling to periodically transmit one of wideband (WB) channel quality information (CQI) and frequency-selective (FS) CQI every P sub-frames, wherein WB CQI transmission instances recur every L*P sub-frames and FS CQI is transmitted during reporting instances between two consecutive WB CQI transmission instances;

scheduling to periodically transmit rank information (RI) every K*(L*P) sub-frames; and in response to a collision between a scheduled RI transmission instance and one of a scheduled WB CQI transmission instance and a scheduled FS CQI transmission instance, dropping transmission of the one of the scheduled WB CQI transmission instance and the scheduled FS CQI transmission instance.

2. The method of claim 1, wherein the RI is scheduled to be periodically transmitted using an offset from a scheduled WB CQI transmission instance.

3. The method of claim 1, wherein the period for transmitting the RI, the period for transmitting the WB, and the periodic reporting instances are at least partially configured by a higher layer message in a semi-static manner.

4. A method in a base station for receiving channel information from a mobile station in a communication system, the method comprising:

transmitting reporting configuration information to the mobile station, the reporting configuration information indicating a period of P sub-frames for reporting one of wideband (WB) channel quality information (CQI) and frequency selective (FS) CQI, wherein WB CQI reporting instances recur every L*P sub-frames and FS CQI is reported during reporting instances between two consecutive WB CQI reporting instances, and a period of K*(L*P) sub-frames for reporting rank information (RI);

receiving the RI, WB CQI and FS CQI from the mobile station according to the reporting configuration information; and in response to a collision between an RI report and one of a WB CQI report and an FS CQI report, dropping the one of the WB CQI report and the FS CQI report.

5. The method of claim 4, further comprising configuring an offset between an RI reporting instance and a WB CQI reporting instance.

6. The method of claim 4, wherein the period for reporting the WB CQI and the period for reporting the RI are at least partially configured by a higher layer message in a semi-static manner.

7. A mobile station, comprising:
a transmitter configured to:

schedule to periodically transmit one of wideband (WB) channel quality information (CQI) and frequency-selective (FS) CQI every P sub-frames, wherein WB CQI transmission instances recur every L*P sub-frames and FS CQI is transmitted during reporting instances between two consecutive WB CQI transmission instances, schedule to periodically transmit rank information (RI) every K*(L*P) sub-frames, and in response to a collision between a scheduled RI transmission instance and one of a scheduled WB CQI transmission instance and a scheduled FS CQI transmission instance, drop transmission of the one of the scheduled WB CQI transmission instance and the scheduled FS CQI transmission instance.

8. The mobile station of claim 7, wherein the transmitter is further configured to schedule the RI to be periodically transmitted using an offset from a scheduled WB CQI transmission instance.

9. The mobile station of claim 7, wherein the period for transmitting the RI, the period for transmitting the WB, and the periodic reporting instances are at least partially configured by a higher layer message in a semi-static manner.

10. A base station capable of wireless communication with a plurality of mobile stations in a communication system, the base station comprising:

a transmitter configured to transmit reporting configuration information to a mobile station, the reporting configuration information indicating a period of P sub-frames for reporting one of wideband (WB) channel quality information (CQI) and frequency selective (FS) CQI, wherein WB CQI reporting instances recur every L*P sub-frames and FS CQI is reported during reporting instances between two consecutive WB CQI reporting instances, and a period of K*(L*P) sub-frames for reporting rank information (RI); and a receiver configured to receive the RI, WB CQI and FS CQI from the mobile station according to the reporting configuration information, wherein, in response to a collision between an RI report and one of a WB CQI report and an FS CQI report, the one of the WB CQI report and the FS CQI report is dropped.

11. The base station of claim 10, wherein the transmitter is further configured to configure an offset between an RI reporting instance and a WB CQI reporting instance.

12. The base station of claim 10, wherein the period for reporting the WB CQI and the period for reporting the RI are at least partially configured by a higher layer message in a semi-static manner.

* * * * *